United States Patent [19]

Bliss

[11] Patent Number: 4,727,913
[45] Date of Patent: Mar. 1, 1988

[54] DUST CONTROL LOADING DEVICE

[75] Inventor: James A. Bliss, Tonawanda, N.Y.

[73] Assignee: Occidental Chemical Corporation, Niagara Falls, N.Y.

[21] Appl. No.: 835,502

[22] Filed: Mar. 3, 1986

[51] Int. Cl.$^4$ .............................................. B65B 1/04
[52] U.S. Cl. ......................................... 141/7; 141/93; 141/286; 193/25 C; 222/460; 239/590.3; 239/590.5; 414/291; 414/293
[58] Field of Search .................. 141/93, 99, 1–12, 141/285–310, 94, 95, 96, 382, 383, 384, 385, 386; 193/25 C, 30, 34; 414/291, 293; 239/590.3, 590.5; 222/460, 462, 567

[56] References Cited

U.S. PATENT DOCUMENTS

| | | | |
|---|---|---|---|
| 487,531 | 12/1892 | Kiefer | 141/297 |
| 1,938,138 | 12/1933 | Downs | 141/299 |
| 2,336,430 | 12/1943 | Wery | 141/286 |
| 3,428,156 | 2/1969 | Charyn et al. | 141/382 |
| 4,497,345 | 2/1985 | Lees | 138/37 |
| 4,549,585 | 10/1985 | Emerson | 141/95 |
| 4,558,724 | 12/1985 | Carlsson | 141/286 |

Primary Examiner—Houston S. Bell, Jr.
Attorney, Agent, or Firm—James F. Tao; Arthur S. Cookfair

[57] ABSTRACT

This invention relates to a dust suppressing device for use in the discharge of granular bulk materials, such as crushed rock, ore, and the like, for example, during the loading of such material onto a transport vehicle such as a ship. The device comprises
(a) a central hopper;
(b) a first outer tubular member, coaxially disposed and concentrically spaced outward with respect to the hopper; and
(c) a second tubular member coaxially disposed and concentrically spaced outward with respect to the hopper and the first tubular member. The spacing between the central hopper and the first tubular member and the spacing between the first and second tubular members are such as to provide alternate path for the discharge of granular material when the flow rate of the granular material into the hopper exceeds the capacity of the hopper.

6 Claims, 3 Drawing Figures

DUST CONTROL LOADING DEVICE

BACKGROUND OF THE INVENTION

This invention relates to apparatus for the suppressing of dust during the discharge of bulk or granular materials, such as grain, fertilizers, coal, powdered chemicals, crushed rock, sand, ore, and the like, especially in association with loading of such materials into transport vehicles such as rail cars, trucks, barges, ships and the like. It is of particular utility in association with the loading of phosphate rock, and the like.

Granular or particulate materials are commonly sold and transported in bulk. Typically such materials may be loaded into transport vehicles, such as railroad cars, ships and the like by transport from a reservoir or storage area through a conveyor system to a point above the transport vehicle employed and then allowed to fall through discharge chutes or spouts into a container or hold of the transport vehicle. Some bulk materials such as grain, tend to discharge a great deal of the entrained dust into the air as the material is falling downwardly. In addition, dust is generally released into the air when the falling stream of particles impacts with the bulk material pile in the vehicle. One common approach to controlling the emission of dust into the atmosphere is to enclose the falling column of granular material within a flexible conduit and, using an aspirator means, create a countercurrent of air to carry the dust to a disposal means such as a filter. In the case of lower density bulk materials, such as grain and the like, a major portion of the dust may be discharged from the falling stream of material and thus may be, to a great extent, controlled by such aspirator means. However, in the case of denser bulk materials, such as dry phosphate rock, a major portion of the dust is discharged when the falling material impacts with the pile being deposited in the vehicle. The control of dust by vacuum or aspirator means at this point is generally less efficient. It is to the control of dust created at this point that the present invention is primarily directed.

It will be appreciated that the discharge of dust during such loading operations is disadvantageous for a number of reasons. First, the loss of material as a result of the dispersal of dust may represent an economic loss. More importantly, the discharge of dust into the atmosphere creates an environmental hazard in the pollution of the surrounding air. The polluted air may be deleterious to workers as well as others in the area who are breathing the air. Workers may be protected by means of suitable respiratory masks or other protective breathing apparatus. Such solution, however, is not only inconvenient and expensive, but in addition is limited to workers in the immediate area, and does not afford protection to others who may be near enough to be affected by the polluted air. In addition, the discharge of dust into the atmosphere decreases visibility and may present a safety hazard from the decreased visibility as well as a health hazard from the air pollution.

Increasing recognition of such health and safety hazards has resulted in the enactment of legislation dealing with the protection of air quality and requiring control of the discharge of dust and particulate matter into the atmosphere.

Accordingly, it is a primary object of the invention to provide apparatus which will suppress or inhibit the release of dust during the discharge of granular or bulk material. It is a further object to provide apparatus which is particularly useful in the suppression of dust emission during the loading of dense granular or bulk material, such as dry phosphate rock into the container or hold of a transport vehicle, such as a railroad car, truck, ship or barge.

SUMMARY OF THE INVENTION

In accordance with the present invention, there is provided a dust suppressing device for use in discharging particulate material comprising:

(a) a central hopper;

(b) a first outer tubular member coaxially disposed and concentrically spaced outward with respect to said hopper and having a length greater than said hopper; and (c) a second tubular member coaxially disposed and concentrically spaced outward with respect to said hopper and said first tubular member and having a length greater than said first tubular member; each tubular member having a receiving end and a discharge end for the passage therethrough of bulk material, the discharge end of said first and second tubular members being substantially on a plane with the discharge end of said hopper.

The dust suppressing device of this invention is adapted to receive and distribute a stream of bulk matter flowing by gravity for example, through a discharge or downspout into a transport vehicle such as a railroad car, or the hold of a ship or barge. In use, the device may be attached to the end of a vertical discharge chute or downspout, or spaced below the chute or downspout, close to the top surface of the deposited pile of particulate material. The dust suppressing device is positioned centrally with respect to the downspout or falling stream of material in such a manner that the falling stream of material is aimed at the central hopper of the device. The central hopper is characterized by narrower diameter at the discharge end than at the receiving end. Thus, as the flow rate of the particulate material increases, a point will be reached where the hopper will retard the passage of the material, in a bottleneck fashion, causing it to pile up within and then above the hopper. As the pile above the hopper increases in height, the excess bulk material will be deflected, with a resultant reduction in velocity, and fall through the space between the hopper and the first tubular outer member. A further increase in flow rate may then result in a further back-up of material causing a pile or cone of material to build across the entire diameter of the first tubular member. The overflow therefrom will then discharge through the space between the first tubular member and the second tubular member. In this manner, the velocity of the falling material is reduced at a point above the growing pile of material being deposited. As the loading of the transport vehicle proceeds, the height of the pile being deposited in the transport vehicle increases, the dust suppressing device is raised to maintain a distance between the discharge end of the device and the top of the growing pile, typically of about ½ to 2 feet. In this manner, the final dust releasing impact of the falling material is minimized. In practice, to further minimize the release of dust into the atmosphere, the upper portion of the stream of falling particulate material is enclosed in a downspout, such as a telescopic or scavenger spout, the discharge end of which is positioned directly over the cylindrical hopper, for example, at a distance of about 10 to 30 inches, and the entire downspout and downwardly flowing stream of material is further enclosed by an outer sleeve or conduit which may extend the entire length of the falling stream. Typically the outer sleeve is of sufficient diameter to allow a space between the sleeve and the falling stream and/or spout and dust suppressing device to allow the upward passage of air along the inner surface of the sleeve. In this manner, excess dust within the sleeve may be removed by aspirator means located, for example, at a point near the upper end of the sleeve, and transported to a removal means, such as a filter or the like. The entire assemblage of the apparatus through which the downward stream of granular or bulk material flows, is desirably adapted to be raised at the discharge end to maintain a constant spacing between the discharge end of the dust suppressing device and the growing pile of particulate material.

BRIEF DESCRIPTION OF THE DRAWINGS

The above description, as well as further objects, features, and advantages of the present invention, will be more fully appreciated by reference to the accompanying drawings, wherein.

DETAILED DESCRIPTION OF THE INVENTION

Figure 1:
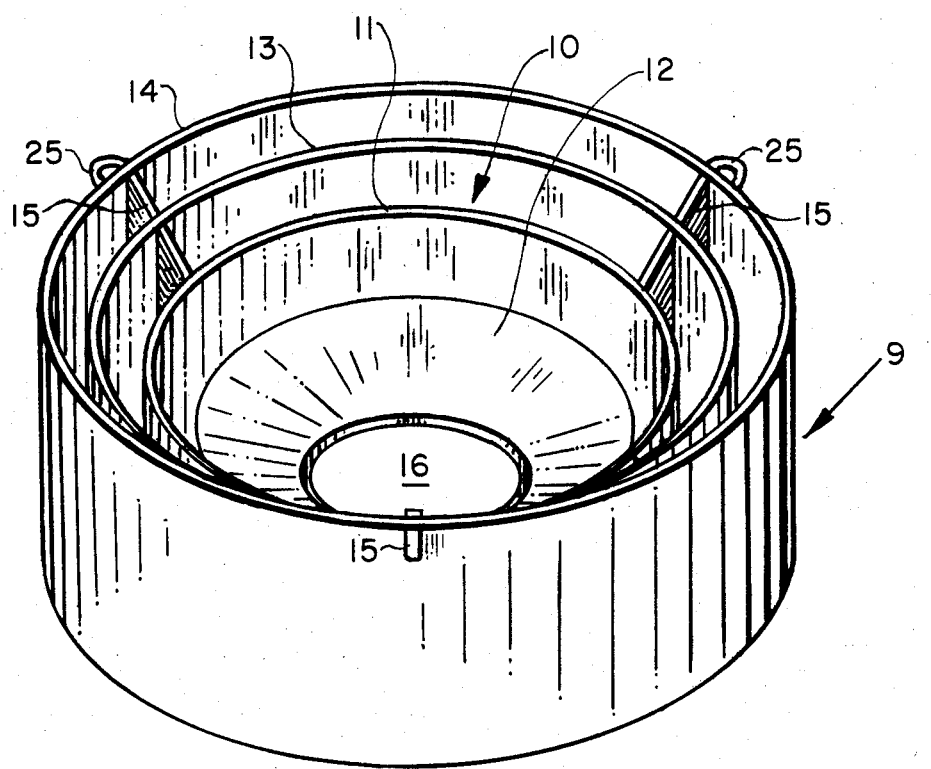
FIG. 1 is a perspective view of the dust suppressing device of the invention.
Figure 2:
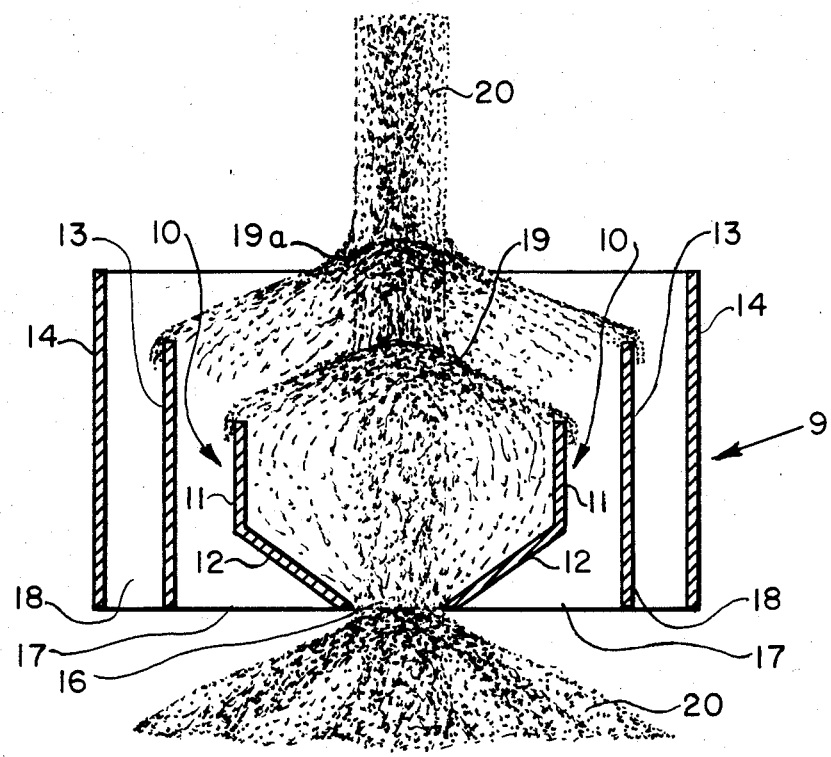
FIG. 2 is a sectional view of the dust suppressing device shown in FIG. 1 in use, with a stream of bulk material being received and discharged.

Referring now with more particular detail to the accompanying drawings, there is shown in FIG. 1 a perspective view and FIG. 2, a longitudinal sectional view of the dust suppressing device of this invention, wherein a centrally positioned hopper 10 comprises an upper tubular portion 11 and a lower funnel or truncated conical portion 12 having a lower opening 16. A first outer tubular member 13 and a second outer tubular member 14 are maintained in spacial relationship with each other and with the central hopper, by means of supports 15. The number of such supports 15 may vary but should be sufficient to impart mechanical stability to the device. Typically, the number of supports 15 will be between about 3 and about 6. At relatively low flow rates, the falling bulk material 20 will flow through opening 16 of hopper 10. As the flow rate increases, a mass of bulk material will tend to accumulate in hopper 10 until a cone 19 of the bulk material is formed as shown in FIG. 2. As the flow of material continues, excess bulk material will be deflected to fall through annular space 17. Further increases in the flow rate of material may exceed the capacity of the opening 16 and annular space 17, causing a further accumulation of bulk material to form a cone 19a to build up across the entire diameter of the first tubular member 13 and deflect excess bulk material through annular space 18.

Figure 3:
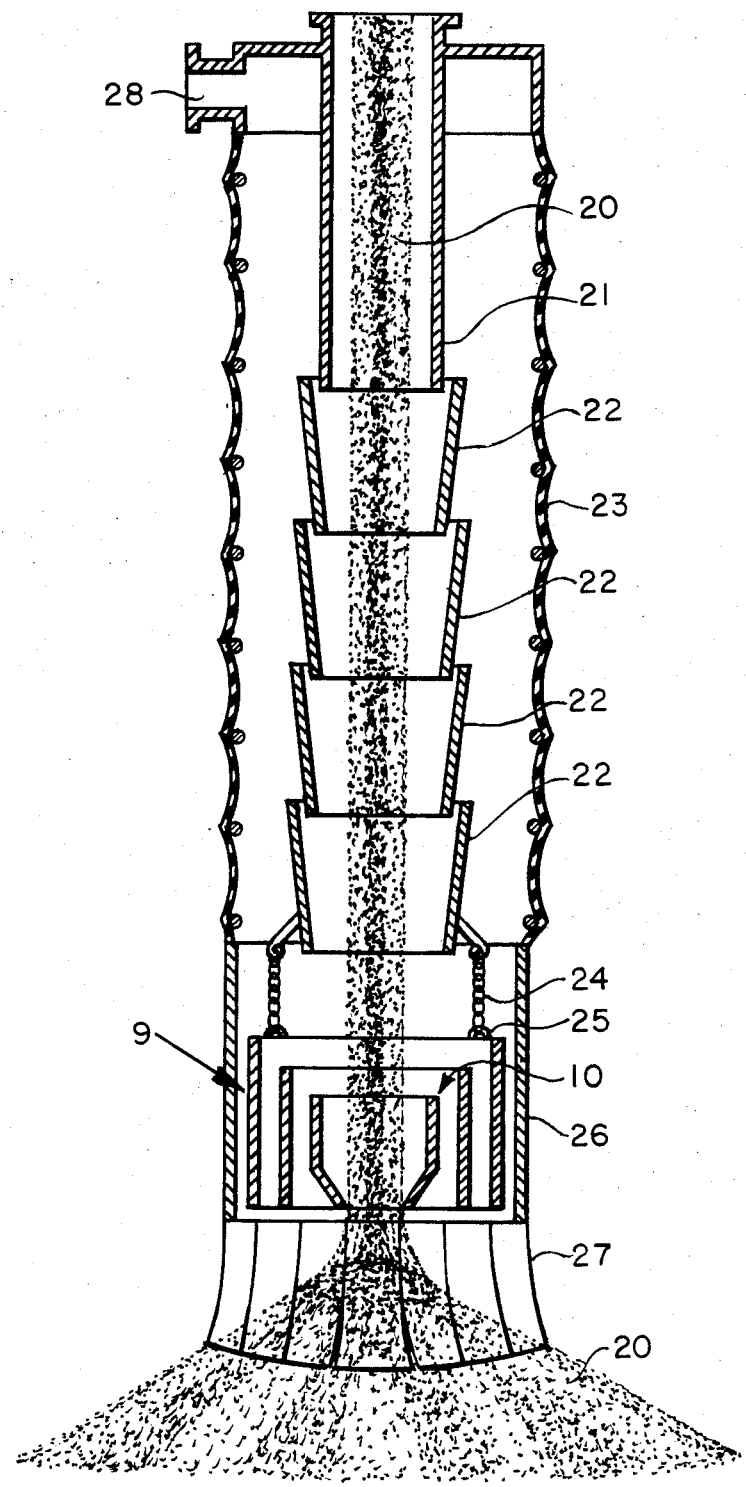
FIG. 3 is a sectional view of a bulk material transport loading system employing the device of this invention.

In practice, the device of the present invention has been found particularly useful as a component of a delivery system such as that depicted in FIG. 3. In the operation illustrated, granular material 20 is conveyed to a downspout 21 positioned over the container or hold to be filled, and allowed to fall through the spout to the central hopper 10 of the dust suppressing device 9. Various types of downspouts may be employed in combination with the dust suppressing device of this invention. In the embodiment illustrated in FIG. 3, the downspout 21 comprises a series of conical sections 22, arranged in a loose-fitting telescopic relationship, that serve to guide and contain the falling stream of material. The downspout is surrounded by a flexible conduit 23 which serves to contain dust and provide a countercurrent passageway for dust and fine particles to be removed upwardly by means of an aspirator (not shown) or the like connected to opening 28.

The dust suppressing device 9 may be suspended from the lower end of the downspout by suspension means 24 such as a chain, cable or the like attached to attachment means 25 such as hooks or the like on the dust suppressing device. The dust suppressing device is surrounded by an enclosure 26, such as a cylinder suspended below the flexible conduit 23. The apparatus may also include a lower flexible enclosure such as a skirt 27, which may be made of plastic, rubber or the like to further contain dust and airborne particulate matter within the system. When an aspirator or vacuum means is connected at opening 28, dust and fine airborne particles can be efficiently removed in a counter-current of air along the space between the outer flexible conduit 23 (and extension 26) and the downspout 22. However, in the loading of dense bulk material, such as phosphate rock, the greatest amount of dust is generated at the end of the stream of falling material, that is, at the point of impact. Without the device 9 of this invention, that location is at the tope of the pile of bulk material 20 being deposited, at the lower end of the apparatus, for example, inside of the flexible skirt, 27. However, the removal of dust from this location is less efficient than from locations at higher points within the flexible conduit 23 or extension cylinder 26. It is a specific advantage of the present invention that as the flow rate of the bulk material is increased, the primary point of impact of the falling material is raised to a higher level (that is, the top of the dust suppressing device 9) within the extension cylinder 26. At that point, where the dust can be removed more efficiently, the primary impact of the falling particles, and thus the major source of dust generation, occurs. At higher flow rates, the falling particles, exiting the dust suppressing device 9 have only a few inches to fall before striking the pile of deposited material 20, thus creating minimal dust at that point where dust removal is less efficient.

In the practice of the invention, it has been found particularly advantageous to position the dust suppressing device 9 of the invention at a height of about 6 to 24 inches above the level of the pile of material 20 being deposited.

EXAMPLE

A dust suppressing device of the type depicted in FIG. 1 was employed in the loading of phosphate rock into the hold of a ship. The device, (fabricated from steel), comprised a central hopper 10 having an upper cylindrical tubular portion 11 with a diameter of 32 inches and a lower conical portion 12 having an opening 16 of 12 inches with an overall length of 10 inches; a first outer tubular member 13 having a diameter of 38 inches and a length of 16 inches; and a second outer tubular member 14 having a diameter of 44 inches and a length of 22 inches. The dust suppressing device was suspended about 18 inches below the outlet of a 28 inch diameter telescopic downspout of the type depicted in FIG. 3, and the entire system maintained at a height sufficient to provide a distance of about 12 inches between the bottom of the device and the pile of phosphate rock being deposited. The phosphate rock was initially conveyed to the downspout and allowed to fall through the downspout and device to the bottom of the hold of the ship being loaded—a total distance of about 70 feet. The system was found to accomodate a transfer of about 3200 tons per hour of phosphate rock. In use, at flow rates of less than about 500 tons per hour, the stream of falling rock particles was contained within the central hopper with some of the particles dropping directly through the bottom opening 16 while other particles were deflected off the sloped sides of the lower conical portion 12 and then out the opening 16. As the flow rate was increased to the capacity of the hopper 10, a portion of the falling particles were observed to spill over and fall through the adjacent annular space 17. in the manner shown in FIG. 2. As the flow rate further increased to reach the flow-through capacity of the central hopper 10 and the annular space 17, a cone of the bulk material 20, formed across the top of the tubular member 13 and the excess spilled over and fell through annular space 18. During the loading, the opacity of the air, due to dust, was monitored by visual estimate, at a point in the open air, just above the hold being loaded. At the highest flow rate (about 3200 tons per hour) the opacity of the air was about 7 percent. Under similar loading conditions, when the dust suppressing device of this invention was not used, the opacity of the air at the same measuring point, due to dust generation from the loading operation, was 30–40 percent.

What is claimed is:

1. A dust suppressing device for use in discharging particulate material comprising:
   (a) a central hopper having a receiving end and a discharge end for the passage of particulate material therethrough;
   (b) a first outer tubular member coaxially disposed and concentrically spaced outward with respect to said hopper and having a length greater than said hopper;
   (c) a second tubular member coaxially disposed and concentrically spaced outward with respect to said hopper and said first tubular member and having a length greater than said first tubular member, each of said first and second tubular members having a receiving end and a discharge end for the passage of particulate material therethrough; and
   (d) the discharge end of said first and second tubular members being substantially on a plane with the discharge end of said hopper.

2. A device according to claim 1 wherein said cylindrical hopper comprises an upper tubular portion and a lower conical portion.

3. A dust suppressing device adapted to be suspended below the output end of a discharge chute through which a stream of particulate material flows by gravity in a downward path, said device comprising:
   (a) a central hopper having a receiving end for receiving the stream of particulate material and a discharge end having a narrower diameter than the receiving end, whereby the flow of particulate material therthrough is retarded in bottleneck fashion to cause a pile-up of material within and above the hopper and the resultant deflection of excess particulate material;
   (b) a first outer tubular member coaxially disposed and concentrically spaced outward with respect to said hopper and having a length greater than said hopper, providing an annular space between the hopper and first tubular member for the passage of said excess particulate material;
   (c) a second tubular member coaxially disposed and concentrically spaced outward with respect to said hopper and said first tubular member and having a length greater than said first tubular member, providing an annular space between the first tubular member and the second tubular member for the passage of additional excess particulate material; each of said first and second tubular members having a receiving end and a discharge end for the passage of particulate materials therethrough, the discharge end of said tubular members being substantially on a plane with the discharge end of said hopper.

4. A device according to claim 3 having a plurality of hook means suitable for suspension below the output end of a discharge chute.

5. An apparatus for the dust free loading of granular materials comprising a dust suppressing device attached directly below the output end of a discharge chute through which a stream of granular material flows by gravity in a downward path; an outer flexible conduit; and a vacuum means whereby dust and airborne particles may be removed; said dust suppressing device comprising
   (a) a central hopper having a receiving end and a discharge end;
   (b) a first outer tubular member coaxially disposed and concentrically spaced outward with respect to said hopper and having a length greater than said hopper; and
   (c) a second tubular member coaxially disposed and concentrically spaced outward with respect to said hopper and said first tubular member and having a length greater than said first tubular member; each tubular member having a receiving end and a discharge end for the passage therethrough of granular material, the discharge end of said first and second tubular members being substantially on a plane with the discharge end of said hopper.

6. A method for reducing the dust created during the transfer of particulate material by gravity flow through a discharge chute which comprises causing the flow of material to part through a dust suppressing device attached directly below the output end of the discharge chute, said chute and dust suppressing device being position within an outer conduit for the vacuum removal of dust, said dust suppressing device comprising:
   (a) a central hopper having a receiving end for receiving the stream of particulate material and a discharge end having a narrower diameter than the receiving end, whereby the flow of particulate material therethrough is retarded in bottleneck fashion to cause a pile-up of material within and above the hopper and the resultant deflection of excess particulate material;
   (b) a first outer tubular member coaxially disposed and concentrically spaced outward with respect to said hopper and having a length greater than said hopper, providing an annular space between the hopper and first tubular member for the passage of said excess particulate material;
   (c) a second tubular member coaxially disposed and concentrically spaced outward with respect to said hopper and said first tubular member and having a length greater than said first tubular member, providing an annular space between the first tubular member and the second tubular member for the passasge of additional excess particulate material; each of said first and second tubular members having a receiving end and a discharge end for the passasge of particulate materials therethrough, the discharge end of said tubular members being substantially on a plane with the discharge end of said hopper.

* * * * *